April 21, 1936.  F. N. BECKER  2,038,159
STOVE
Filed June 29, 1933   5 Sheets-Sheet 1

Fig. 1.

Inventor
Frank N. Becker,
By Watson, Coit, Morse & Grindle
Attorneys

April 21, 1936.    F. N. BECKER    2,038,159
STOVE
Filed June 29, 1933    5 Sheets-Sheet 2

Inventor
Frank N. Becker,
By Watson, Coit, Morse & Grindle.
Attorneys

April 21, 1936.　　　F. N. BECKER　　　2,038,159
STOVE
Filed June 29, 1933　　　5 Sheets-Sheet 4

April 21, 1936.  F. N. BECKER  2,038,159

STOVE

Filed June 29, 1933   5 Sheets-Sheet 5

Inventor
Frank N. Becker,
By Watson, Coit, Morse & Grindle
Attorneys

Patented Apr. 21, 1936

2,038,159

UNITED STATES PATENT OFFICE 2,038,159

STOVE

Frank N. Becker, Jeddo, Pa., assignor to Jeddo-Highland Coal Company, Jeddo, Pa., a corporation of Pennsylvania Application June 29, 1933, Serial No. 678,271

9 Claims. (Cl. 126—4)

The present invention relates to stoves and particularly to combined cooking and heating stoves of the relatively small size and compact nature suitable for household use.

In my copending application, Serial No. 532,303, filed April 23, 1931, is described and claimed a combination cooking and heating stove, and the present application comprises a continuation in part of that previously filed.

The stove which comprises the subject matter of the present application is designed particularly for the consumption of coal or coke, which fuels are readily obtainable at small cost almost everywhere, but it may be fired in emergencies, however, with wood or the like, having considerable flexibility in this respect. In fact it is a particular object of my invention to provide a combined cooking and heating stove which has great flexibility in use, not only because it may burn various fuels but also because its capacity as a cooking instrumentality may be varied readily, depending upon the amount of cooking to be done, and its capacity to deliver heated air for house heating purposes may be widely modified at the will of the operator. In other words, the stove may be used for the simultaneous preparation of many or few articles of food and may be operated to deliver a very large quantity of highly heated air for the purpose of heating a large enclosed space when the temperature outside is low or may be operated to deliver a relatively small quantity of warmed air when the weather is moderate. The improved heating unit is well adapted for use in homes or apartments of moderate size and is so designed and constructed that it occupies no more space than the household cooking and water heating range now in common use.

Largely by reason of its flexibility, as just pointed out, the stove may be operated with great economy as it may be controlled so as to produce just the amount of heat necessary for the purpose in hand. The coal which is actually consumed in the development of heat is most efficiently utilized not only in cooking but in house heating. The unit comprises essentially a casing which is preferably rectangular in vertical, longitudinal, and transverse sections and rectangular in horizontal section, which casing encloses the combustion spaces or chambers, of which there are two, the oven, and a heat exchanger of novel character which functions to effect the transfer of heat from the products of combustion passing out of the combustion chambers and moving toward the stack, to a moving column of air which enters the stove at one point and escapes therefrom at another point. It is preferred that the stove be constructed so as to resemble in all major particulars, and have substantially the same dimensions as, the ordinary household cooking stove adapted for the burning of solid fuel in order that it may be substituted readily for stoves already installed or which may be newly installed in any modern structure.

The heated air may be delivered from an orifice in the top of the stove by natural draft, but I contemplate also the use of a fan or blower for forcing the air under light pressure through the air conduit enclosed within the casing. By providing means for forcing the air in this manner, it is possible to form the outlet aperture for the heated air in the bottom wall of the stove casing instead of in the top, and it is further possible to employ so much of the stream of air which is thus forced into the stove as may be necessary to operate the fire or fires, as the case may be, under forced draft. The instrumentality for producing the forced draft is so positioned that the air in the air duct or conduit enclosed by the stove casing is under slightly greater than atmospheric pressure rather than under a pressure slightly less than atmospheric. If, by reason of any accident, there should be a break in the plates or sheets which separate the stream of air passing through the stove from the stream of hot products of combustion, air would leak into the offtake for the products of combustion because of the superior pressure of the air, instead of the reverse taking place, i. e., products of combustion leaking into the air flue or conduit. Notwithstanding the fact, therefore, that a stream of air is constantly passing through the stove so long as it is in operation and is constantly absorbing heat from a rapidly moving stream of highly heated products of combustion from which it is only separated by thin plates or the like, it is impossible for the air to pick up, in its travel through the stove, any carbon monoxide or other injurious compounds. If any leakage occurs, it will be leakage of the air into the products of combustion, and hence the stove is perfectly safe at all times and may be freely used for household heating purposes.

The stove comprises a minimum number of parts, is of rugged construction, and is well adapted to withstand the severe usage to which a stove of this general type is usually subjected. It has many minor features of novelty as will be hereinafter pointed out although, as will be clear to one skilled in the art, the embodiment of the invention which is illustrated and which will be hereinafter described in detail is set forth by way of example only, it being easily possible to vary the design and arrangement of the component elements of the stove so that it may present quite a different external appearance from that shown, or the internal parts may be redesigned and/or rearranged, should the necessity of such redesign or rearrangement present itself.

Figure 1:
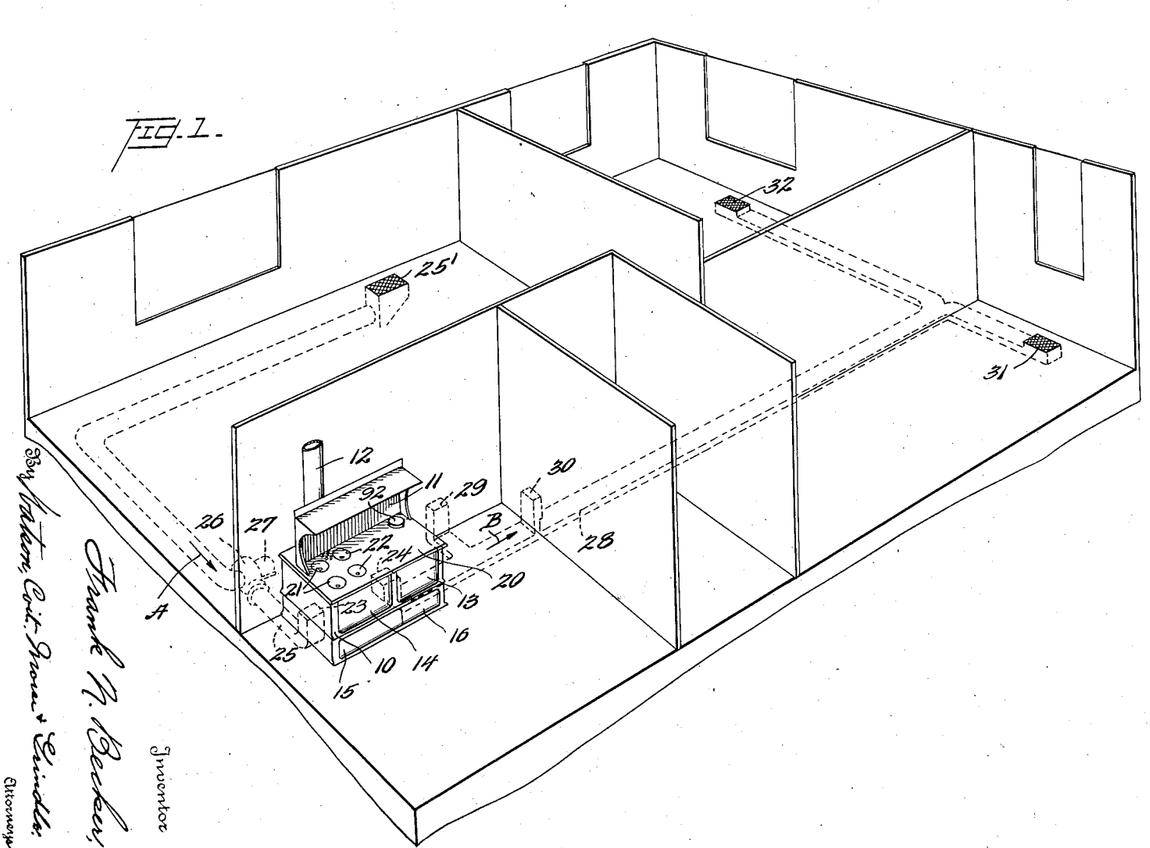
Figure 1 is a perspective view of a portion of a single floor of a dwelling, or apartment, with ceiling and front walls removed, showing the stove positioned in one room and conduits for heated air extending from the stove to the other rooms to be heated.
Figure 2:
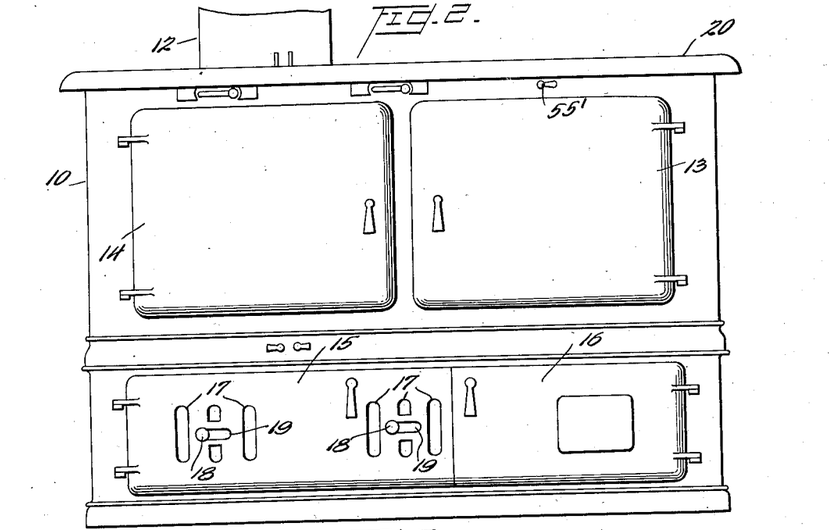
Figure 2 is a front elevation of the stove.

As is apparent from an inspection of Figures 1 and 2, the stove, in general exterior configuration, considerably resembles the ordinary cooking stove which is now commonly used. It may be said to comprise a casing 10 which is rectangular in horizontal section and rectangular in vertical longitudinal and vertical transverse section, the flat top of the stove comprising a bearing member for cooking utensils and the like and there being a suitable shelf supporting fixture 11 and stack or offtake 12 by means of which the products of combustion are conducted to the usual chimney. Swinging doors at the front of the stove close openings in the front wall of the casing, the door 13 comprising a closure for the oven, the door 14 a covering for the grate bar operating mechanism, the door 15 a closure for the openings provided for the removal of ashes from beneath the grates, and the door 16 a closure for a storage opening beneath the oven. Suitable handles for operating the doors are provided, it being understood, of course, that the doors are mounted to swing upon hinges in the usual manner.

Door 15 is further provided with openings 17 through which air under natural draft may pass to the combustion spaces, of which there are two, the volume of air passing through openings 17 being easily regulated by the operator by means of dampers slidably mounted upon the rear of door 15 and manually operable, respectively, by means of handles 18 extending through slots 19. The top of the stove casing, which is indicated at 20, is provided with a plurality of apertures formed therein above the combustion spaces and by means of which fuel may be introduced, these apertures being preferably circular as is customary practice and enclosed by the usual disc-like stove lids, the two lids indicated by the numeral 21 being immediately above one of the combustion spaces or chambers and the lids 22 being above the second combustion space.

Before describing the interior construction of the stove, it may be helpful to explain that the bottom of the casing is provided, at approximately the rear corners thereof, with rectangular or circular openings indicated generally at 23 and 24 in the drawings and that these bottom openings comprise respectively the inlet for cold or unheated air and the outlet for heated air. For leading air to be heated to the inlet port 23, a pipe or main 25 is provided, which main is preferably positioned beneath the floor of the house shown in Figure 1 and may have its inlet either at the point 25' shown in the drawings or positioned at a cellar window so as to take fresh air from the outside, as is customary in many hot air heating installations. At a point along the main 25 is positioned a fan or blower 26 which may be operated by an electric motor 27, this fan or blower propelling the air through main 25 in the direction of the arrow A and forcing it under a pressure which, of course, may be varied at will by modifying the speed of the motor, into the stove through aperture 23.

If the fires in the stove are operated under forced draft, a portion of this incoming air may be diverted into the combustion spaces. Either all or the major portion of the air which is blown into the stove casing, however, finds its way out through the discharge port 24 into the hot air distributing main 28, passing along this main in the direction of the arrow B. To the main are connected a plurality of registers indicated at 29, 30, 31, and 32 through which the hot air may escape into the several rooms in which the registers are respectively located. These rooms are therefore effectively heated by air, the temperature of which was raised to the desired point by a stove located on the same floor. Generally heretofore it has been necessary to locate air heating stoves at points below the rooms to be heated so that the heated air will rise by reason of its natural buoyancy. In accordance with the system which I have devised, however, it is not necessary to have even a small cellar under the house, and its availability as an apartment heater is apparent.

Figure 4:
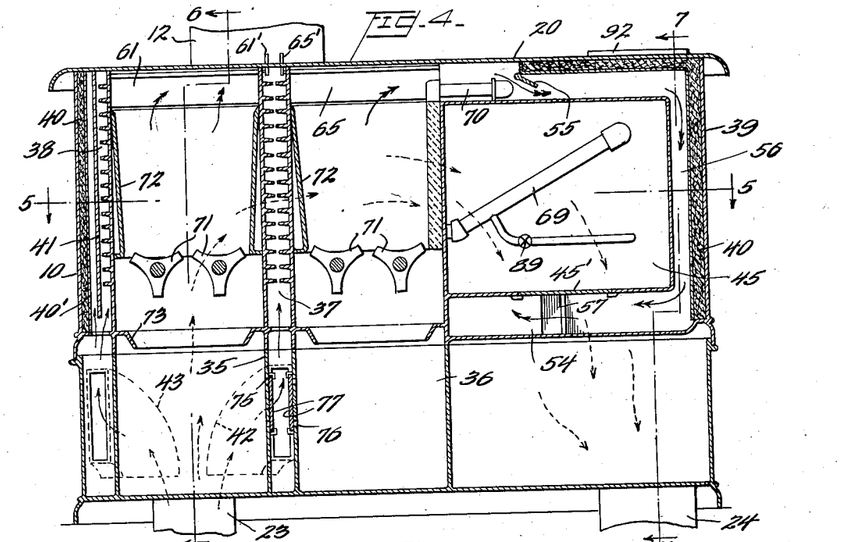
Figure 4 is a section on line 4—4 of Figure 3.
Figure 5:
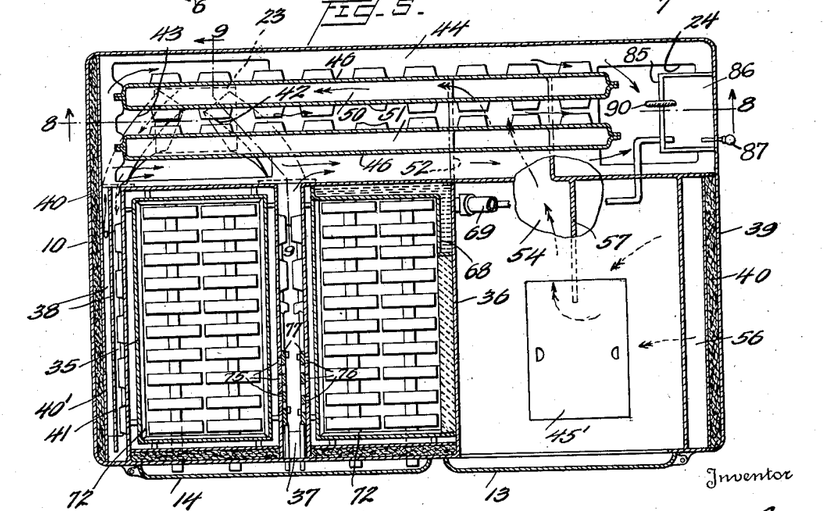
Figure 5 is a section on line 5—5 of Figure 4.
Figure 6:
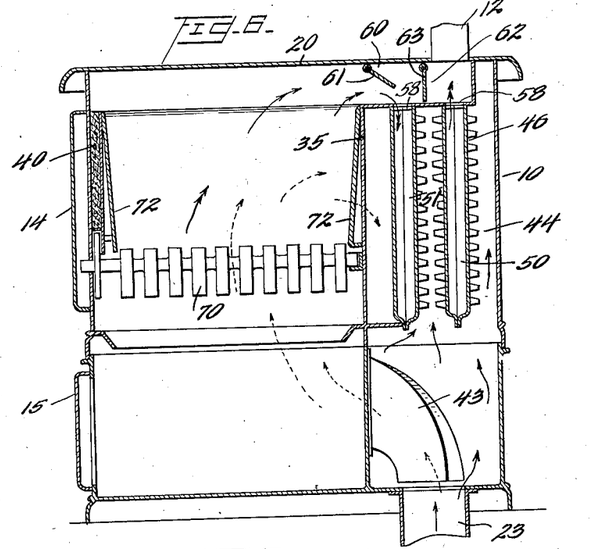
Figures 6 and 7 are, respectively, sections on lines 6—6 and 7—7 of Figure 4.
Figure 7:
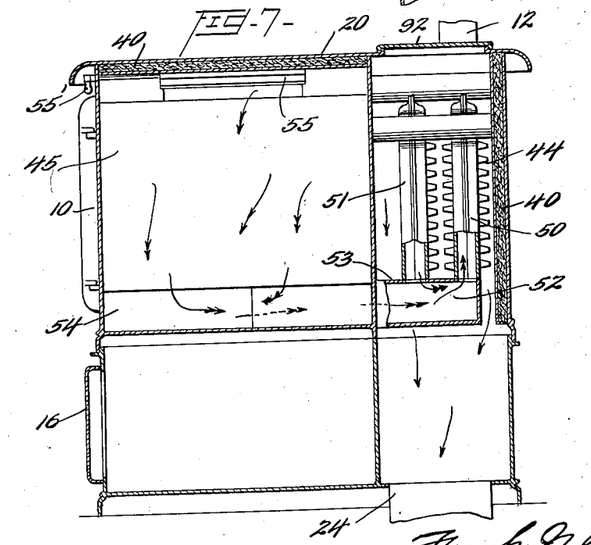

Referring now to the drawings showing the details of the interior construction of the stove, it will be perceived from an inspection of Figures 4 and 5, for instance, that there are two combustion spaces at the left-hand end of the stove and toward the front, each of these spaces being, broadly speaking, enclosed within a vertically extending tubular member rectangular in horizontal section, these tubular members being indicated at 35 and 36. The adjacent walls of members 35 and 36, respectively, are spaced apart and disposed in parallel planes, defining between them a space indicated at 37, for the circulation of cooling air. The outer side wall of member 35 is likewise arranged in substantial parallelism with the inner metallic lining 40' of the side wall of the stove casing, the space 38 between these members comprising a channel for the circulation of cooling air. The outer shell of the casing is indicated at 39, and this shell is lined wherever possible with insulating material, indicated at 40, it being the purpose of thus insulating the side walls to prevent the radiation of heat to the vicinity of the stove itself, which space is generally sufficiently heated merely by radiation from the uninsulated stove top. Substantially midway between parallel plates 35 and 40' is supported a third plate, indicated at 41, which plate is of metal. It is the function of this plate to intercept the radiant heat emanating from the side wall of the adjacent combustion space, to absorb this radiant heat, and to give it up to the air which is caused to circulate in the narrow closed air space 38, thus preventing this heat from being transferred to the lining member 40', heating the insulating material 40 and eventually the exterior casing member 39, and thus causing wastage of heat to the outside. It is found that, by the interposition of the heat absorbing plate and circulation of air thereover, the stove end wall is kept cool at all times, notwithstanding its nearness to a combustion space.

The spaces 37 and 38 are closed at the sides, front, top, and bottom and are only open at the rear. For directing air into these spaces, hoods 42 and 43 are utilized, the downwardly facing inlet ends of these hoods being immediately above the air inlet port 23, the hoods being curved so as to deflect certain portions of the air column rising through port 23 horizontally into the lower portions of the spaces 37 and 38, respectively. The air issuing into these spaces from the hoods sweeps forwardly and upwardly, thence rearwardly, and finally makes its escape into the large air flue, indicated at 44, which extends across the rear of the stove from one end wall to the other and thereby connects the inlet port 23 and the outlet port 24. With the exception of the air deflected by hoods 42 and 43, all of the air which enters through inlet port 23 passes along conduit or duct 44, as indicated by the arrows provided with single tips, and thence downwardly and out through port 24. The air which is actually deflected by hoods 42 and 43 again passes into duct or conduit 44 after circulating through the spaces 37 and 38, as has been previously explained, and eventually also makes its way out through port 24 except possibly for some small portion thereof which may be directed into the combustion spaces for the purpose of securing forced draft combustion, as will be hereinafter more fully explained.

The oven is generally indicated at 45 and comprises essentially a cubical space entirely closed except at the front thereof, the front opening being closed by door 13. There is an opening in the bottom of the oven for cleaning purposes, normally closed by a plate 45'. The oven is heated by products of combustion from the adjacent combustion space which pass around it and by direct radiation.

The air passing through the conduit 44 from port 23 to port 24 is heated by products of combustion passing through the heat exchanger generally indicated at 46.

From an inspection of Figures 3, 4, 5, and 6, it will be apparent that the heat exchanger 46 comprises essentially two elongated chambers 50 and 51 for products of combustion, each chamber having parallel side walls, the margins of which are suitably secured together. These chambers are connected at their lower right-hand ends by a horizontal cross flue 52. A continuation of cross flue 52, indicated at 53, extends forwardly and communicates with horizontally disposed flue or passage 54 beneath the oven. It will be understood that the oven may be heated whenever desired by the products of combustion issuing from the combustion space defined by member 36, which products pass laterally over the top of the oven, as indicated by the double tipped arrows (Figure 4), whenever the damper 55 is opened, thence downwardly through vertical passage 56, and into horizontal passage 54, whence these gases pass around the baffle 57 in this chamber and into the cross duct or common flue 52, thence into heat exchanger element 50, from which they finally make their escape through opening 58 and pass into the stack 12 from which they are ultimately discharged into the atmosphere. Damper 55 may be controlled from the front of the stove by manipulating sliding handle 55' to which the damper is operatively connected.

The products of combustion from the space defined by member 35 pass through horizontal flues 60 when damper 61 is raised and downwardly into heat exchanger element 51 when flue 62, which is a continuation of flue 60, is closed by damper 63. Should it be desired for any reason that the products of combustion from this combustion space be transmitted directly to the stack without passing through the heat exchanger, both dampers 61 and 63, which last mentioned damper controls passage 62, are raised, so that the products of combustion short-circuit the heat exchanger.

Figure 3:
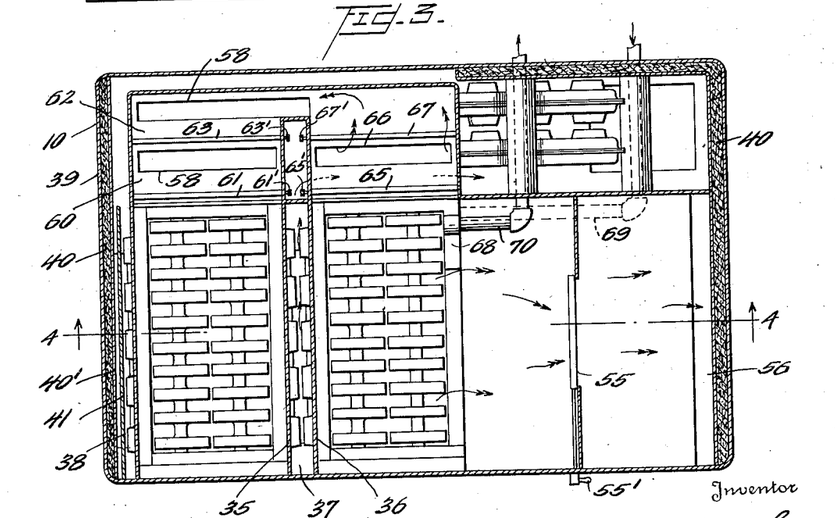
Figure 3 is a plan view of the same, the top of the stove having been removed to show the interior.

The products of combustion from the combustion chamber within member 36 may either pass over and around the oven in the manner heretofore set forth or may be caused to pass through the heat exchanger, the damper 65 being for that purpose moved to raised position and the damper 55 closed. From an inspection of Figure 3, it will be seen that the heat exchange element 51 is provided with an opening 66 in its top into which the products of combustion from the right-hand combustion space may pass. If it be desired that the products of combustion from this combustion space shall pass directly to the stack, both dampers 65 and 67 will be opened, and damper 55 closed. Dampers 61, 63, 65, and 67 may be supported in various ways, but I prefer to mount them on horizontally disposed rotatably supported rods, as shown in Figure 3. Adjacent ends of these rods have operating arms fixed thereon which project upwardly through slots in the top of the stove where they are always in full view. By manipulating these arms, which are indicated at 61', 63', 65', and 67' respectively, the dampers may be positioned as desired. Any suitable means for retaining the arms in adjusted position may be employed.

A water-back of customary type is indicated at 68, inlet and outlet conduits for this back being indicated at 69 and 70 respectively. It will be understood that in each of the combustion spaces suitable grate bars such as indicated at 71 are provided, which bars may be rocked or shaken, in any customary or desired manner, from a position in front of the stove, the ends of the bars being accessible when the door 14 is opened. Suitable firebrick or fire-box linings are indicated at 72 and ash deflectors at 73. It will be understood that suitable ash pans or ash collecting trays will be located in the combustion spaces below deflectors 73, which trays or pans may be removed whenever desired after door 15 has been opened.

A fire may be maintained in either combustion space or, if desired or found necessary, fires may be simultaneously maintained in both combustion spaces. The mutually facing side walls of members 35 and 36 are provided with apertures, indicated at 75 and 76, by means of which air from space 37 and under slight pressure may be released in the combustion spaces, respectively, beneath the grates. The flow of air through each of ports 76 is controlled by a slidable damper 77, which dampers 77 are provided with handles projecting through the front wall of the casing and by means of which they may be easily and quickly positioned as desired.

In the fabrication of the stove casing, cast iron plates and other elements are preferably employed as these are found to be most durable and most able to maintain their shapes and strength at relatively high temperatures. The heat exchanging units are preferably of cast metal together with the brackets or other means which are employed to support these elements in the positions shown. The insulation employed as a lining for the casing walls wherever this is possible is preferably asbestos, but naturally the invention is not limited in this respect.

The flexibility of the stove in operation is great, it being possible to operate only one fire-box and to maintain thereon a "slow" fire under natural draft, as when cooking in warm weather, or to maintain hot fires in both combustion spaces using forced draft for the purpose of developing the greatest heat, in very cold weather. For all rates of fuel consumption, the stove operates efficiently, and both cooking and heating can be accomplished in the average instance by the expenditure of surprisingly small quantities of coal. Should the heat exchanger, or in fact any of the flues through which the products of combustion from the combustion spaces are led to the stack, develop cracks, no serious consequences can ensue inasmuch as the air passing through the air conduits is under a pressure superior to the pressure of the products of combustion, and hence fresh air will leak through these cracks or openings into the waste gas flues, and it will be impossible for waste gases to leak into the air flues. The stove is therefore entirely safe for household heating purposes at all times.

Figure 8:
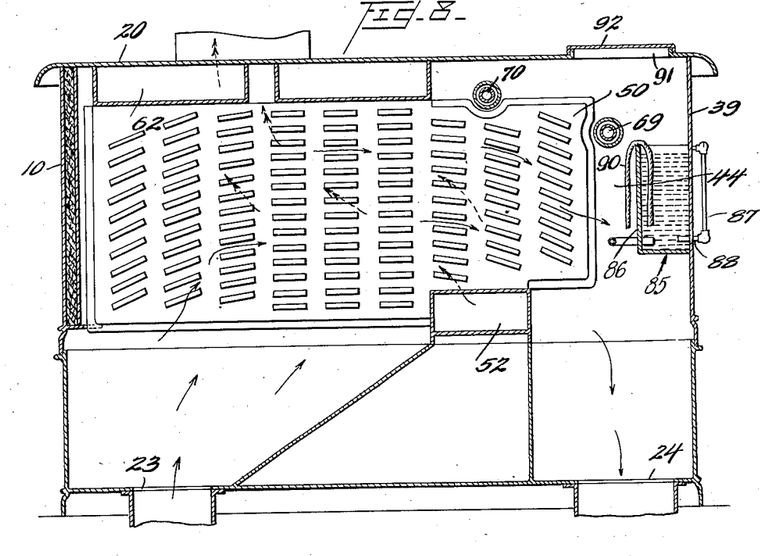
Figure 8 is a section on line 8—8 of Figure 5.
Figure 9:
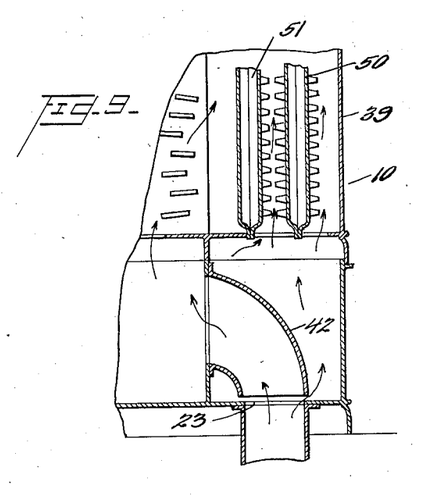
Figure 9 is a section on line 9—9 of Figure 5.

For the purpose of humidifying the air passing through the stove and used for room heating purposes when subsequently discharged, a humidifying device may be inserted in the air channel. Such a device is indicated at 85 in Figures 5 and 8. It comprises a water container 86 affixed to or hung from the shell or wall of the stove, this container being supplied with water in any suitable manner, as through a valve controlled pipe leading from the inlet pipe 69 of the water-back. An exposed sight feed glass 87 is secured to the shell of the stove exteriorly thereof, the lower end of this glass being connected by a lateral pipe 88 with the interior of the container 86 so that the operator may perceive at any time the level of the water within the container and may replenish the same from time to time by opening the valve 89. A wick 90 has one end immersed in the water within the container and its other end suspended in the hot air channel so that evaporation is facilitated in well-known manner. Other types of humidifying devices may be employed if desired.

In certain instances it may be desired to dispense with a positive blower and to conduct the heated air away from the stove as a naturally rising column. In order that this may be done, the top of the stove is provided with an aperture 91 directly above the lower discharge port 24 and of the same shape and size. So long as forced draft is employed, this aperture is closed by a cover plate 92 (Figure 8) so that the air under pressure must pass downwardly to port 24. When natural draft is to be employed, the port 24 may be covered, the cover plate 92 removed, and a suitable offtake pipe for heated air positioned to receive the discharge from the upper port.

Having thus described the invention, what is claimed as new and desired to be secured by Letters Patent is:

1. A household stove for cooking and heating comprising a casing having top, bottom and side walls, the top being horizontally disposed and adapted to support cooking vessels, said casing having formed therein a port through which products of combustion may be discharged and spaced apertures through which, respectively, air to be heated may be introduced and heated air for room heating purposes discharge, means within the casing defining a channel for air passing between said apertures, and heating means housed entirely within the casing for heating to cooking temperatures a single area or two contiguous areas of the casing top, as desired, for cooking purposes, and for transmitting variable amounts of heat to an air stream passing through said air channel, said heating means including two non-communicating primary combustion chambers located, respectively, immediately below the casing top and extending thereto, the adjacent walls of the combustion chambers being spaced apart and together defining a relatively narrow intermediate space for the circulation of cooling air, said space for cooling air intermediate the combustion chambers being in communication with the aforementioned air channel to permit the passage of air from the channel into said space and the return of such air from said space into said channel, a conduit for products of combustion so positioned with respect to said air channel as to transfer heat to the air passing therethrough, said conduit communicating with the discharge port for products of combustion, and means for leading products of combustion from said combustion chambers to said conduit.

2. A stove comprising a casing having a horizontally disposed top adapted to support cooking vessels, and two laterally spaced primary combustion chambers enclosed thereby and extending to said top, whereby a single area or two contiguous areas of the top may be heated to cooking temperatures, as desired, for cooking purposes, the adjacent walls of the combustion chambers together defining a relatively narrow intermediate space for the circulation of cooling air and having apertures formed therein for the passage of combustion supporting air into the combustion chambers, dampers controlling said apertures, and means for circulating air through said space for cooling the combustion chamber walls and for supporting combustion in said chambers.

3. A household stove for cooking and heating comprising a casing having top, bottom and side walls, the top being horizontally disposed and adapted to support cooking vessels, said casing having formed therein a port through which products of combustion may be discharged and spaced apertures through which, respectively, air to be heated may be introduced and heated air for room heating purposes discharged, and heating means housed entirely within the casing for heating to cooking temperatures a single area or two contiguous areas of the casing top, as desired, for cooking purposes, and for transmitting variable amounts of heat to a stream of air passing between said air inlet and outlet apertures, said heating means including two non-communicating primary combustion chambers located, respectively, immediately below the casing top and extending thereto, the adjacent walls of the combustion chambers being spaced apart and together defining a relatively narrow intermediate space for the circulation of cooling air, said space being in communication with said air inlet and outlet apertures whereby a stream of air moving between said apertures passes through said space, a conduit for products of combustion in constant communication with the discharge port for products of combustion, said conduit being so constructed and disposed as to impart heat to the air stream passing between the spaced air inlet and outlet apertures, and means for leading products of combustion from said combustion chambers to said conduit.

4. A household stove for cooking and heating comprising a casing having top, bottom and side walls, the top being horizontally disposed and adapted to support cooking vessels, said casing having formed therein a port through which products of combustion may be discharged and spaced apertures through which, respectively, air to be heated may be introduced and heated air for room heating purposes discharged, means within the casing defining a channel for air passing between said apertures, and heating means housed entirely within the casing for heating to cooking temperatures a single area or two contiguous areas of the casing top, as desired, for cooking purposes, and for transmitting variable amounts of heat to an air stream passing through said air channel, said heating means including two non-communicating primary combustion chambers located, respectively, immediately below the casing top and extending thereto, the adjacent walls of the combustion chambers being spaced apart and together defining a relatively narrow intermediate space for the circulation of cooling air, said space intermediate the combustion chambers communicating at different elevations with the aforesaid air channel and means being provided for directing cooling air from said channel into said space near the bottom thereof, said air after being heated being directed to return to said air channel at a higher elevation, a conduit for products of combustion so positioned with respect to said air channel as to transmit heat to the air passing therethrough, said conduit communicating with the discharge port for products of combustion, and means for leading products of combustion from said combustion chambers to said conduit.

5. A household stove for cooking and heating comprising a casing having top, bottom and side walls, the top being horizontally disposed and adapted to support cooking vessels, said casing having formed therein a port through which products of combustion may be discharged and spaced apertures through which, respectively, air to be heated may be introduced, and heated air for room heating purposes discharged, means within the casing defining a channel for air passing between said apertures, and heating means housed entirely within the casing for heating to cooking temperatures a single area or two contiguous areas of the casing top, as desired, for cooking purposes, and for transmitting variable amounts of heat to an air stream passing through said air channel, said heating means including two non-communicating primary combustion chambers located, respectively, immediately below the casing top and extending thereto, the adjacent walls of the combustion chambers being spaced apart and together defining a relatively narrow intermediate space for the circulation of cooling air, said space for cooling air intermediate the combustion chambers being in communication with the aforementioned air channel to permit the passage of air from the channel into said space and the return of such space into said channel, one wall of one combustion chamber being disposed in parallel spaced relationship to a wall of the casing, the mutually facing chamber and casing wall defining a narrow vertically elongated space for the circulation of cooling air, said space being in communication with the air channel, means for conducting cool air to and into said space near the bottom thereof, means for returning air so introduced, after being heated, to the air channel at a higher elevation, and a conduit for conducting products of combustion from said combustion chambers to said discharge port, which conduit is disposed in heat exchanging relationship to said air channel.

6. A household stove for cooking and heating comprising a casing having top, bottom and side walls, the top being horizontally disposed and adapted to support cooking vessels, said casing having formed therein a port through which products of combustion may be discharged and spaced apertures through which, respectively, air to be heated may be introduced and heated air for room heating purposes discharged, means within the casing defining a definite channel for air passing through said apertures, two horizontally spaced non-communicating primary combustion chambers located, respectively, immediately below the casing top and extending thereto, an oven positioned adjacent one of the combustion chambers, a conduit for products of combustion so positioned with respect to said air channel as to transfer heat to the air passing therethrough, said conduit being in constant communication with the discharge port for products of combustion, a flue extending around said oven and communicating with said conduit, means for causing the products of combustion from the combustion chamber adjacent said oven to flow either directly to said conduit or through said flue around the oven and thence to said conduit, and means for conducting products of combustion from the combustion chamber remote from the oven to the conduit for products of combustion.

7. A household stove for cooking and heating comprising a casing having a top, bottom and side walls, the top being horizontally disposed and adapted to support cooking vessels, said casing having formed therein a port through which products of combustion may be discharged and spaced apertures through which, respectively, air to be heated may be introduced and heated air for room heating purposes discharged, a combustion chamber and an oven within the casing, means defining a definite channel for conducting air to be heated through the casing from the air inlet aperture to the air outlet aperture, one wall of the oven comprising a portion of said means, a conduit for products of combustion connecting the combustion chamber to the discharge port, said conduit having a portion thereof within the air channel for imparting heat to the air flowing through said channel, means to cause flow of air through said channel in such direction that it is heated by said conduit prior to contacting the oven wall, whereby the said oven wall is heated by a stream of heated air, and a flue leading from the combustion chamber around the oven and then to the said conduit whereby products of combustion flowing therethrough are first utilized to impart additional heat to the oven and then to impart heat to the stream of air.

8. The combination set forth in claim 7 in which the aperture in the casing for the escape of heated air is below the oven whereby the outgoing air is caused to flow downwardly over the oven wall.

9. A household stove for cooking and heating comprising a casing having a top, bottom and side walls, the top being horizontally disposed and adapted to support cooking vessels, said casing having formed therein a port through which products of combustion may be discharged and spaced apertures through which, respectively, air to be heated may be introduced and heated air for room heating purposes discharged, a combustion chamber and an oven within the casing, means defining a definite channel for conducting air to be heated through the casing from the air inlet aperture to the air outlet aperture, one wall of the combustion chamber comprising a part of said means and a wall of the oven a second part thereof, a conduit for products of combustion connecting the combustion chamber to the discharge port, said conduit having a portion thereof within the air channel, means to cause flow of air through said channel in such direction that it contacts with, and is heated by, said combustion chamber wall and said conduit, prior to contacting with the oven wall, whereby said oven wall is heated by a stream of heated air, and a flue leading from the combustion chamber around the oven and then to the conduit, whereby products of combustion flowing therethrough are first utilized to impart heat to the oven and then to impart heat to the stream of air.

FRANK N. BECKER.